United States Patent [19]

Watanabe et al.

[11] Patent Number: 5,189,459
[45] Date of Patent: Feb. 23, 1993

[54] AUTOMATIC FOCUSING APPARATUS

[75] Inventors: Toshimi Watanabe, Machida; Akira Ogasawara, Kawasaki, both of Japan

[73] Assignee: Nikon Corporation, Tokyo, Japan

[21] Appl. No.: 701,842

[22] Filed: May 17, 1991

[30] Foreign Application Priority Data

May 22, 1990 [JP] Japan .................... 2-131626

[51] Int. Cl.⁵ .............................. G03B 13/36
[52] U.S. Cl. ...................... 354/402; 354/195.1
[58] Field of Search ............ 354/400, 402, 195.1

[56] References Cited

U.S. PATENT DOCUMENTS 4,972,221  11/1990  Ohnuki et al. ............... 354/402
5,005,037  4/1991   Akashi et al. ............... 354/400
5,040,015  8/1991   Hamada et al. .............. 354/402

FOREIGN PATENT DOCUMENTS

60-37513   2/1985  Japan .
62-269937  11/1987 Japan .
62-269939  11/1987 Japan .

Primary Examiner—Michael L. Gellner
Assistant Examiner—Jae N. Noh
Attorney, Agent, or Firm—Shapiro and Shapiro

[57] ABSTRACT

An automatic focusing apparatus includes a focus detection unit for repeatedly calculating the amount of defocus corresponding to the difference between a surface of a subject image imaged by a taking optical system and a prospective image surface of this system, an image surface speed calculation unit for calculating the speed at which the subject image surface is moved with the movement of the subject based on the amounts of defocus calculated at different times, and a drive control unit for driving and controlling the taking optical system based on the amount of defocus and the subject image surface moving speed calculated. A time information calculation unit calculates time information indicating the time when the surface of the subject image imaged by the taking optical system driven and controlled by the drive control unit will coincide with the prospective image surface based on the amount of defocus and the image surface moving speed calculated, and a shutter release control unit starts, based on this time information, the operation of a shutter release mechanism by a timing such that exposure is effected when the subject image surface coincides with the prospective image surface.

12 Claims, 11 Drawing Sheets

| CONDITION | RELEASE OPERATION |
|---|---|
| $t_C-t_R < 0$ | PROHIBIT RELEASE |
| $0 \leq t_C-t_R \leq TL$ | START RELEASE ACTION IMMEDIATELY WITH A CONSTANT TIME-LAG TL |
| $TL < t_C-t_R \leq A$ | START RELEASE ACTION AT A TIME $t_R' = t_C-TL$ |
| $A < t_C-t_R$ | PROHIBIT RELEASE |

| CONDITION | RELEASE OPERATION |
|---|---|
| $t_c-t_R < 0$ | PROHIBIT RELEASE |
| $0 \leq t_c-t_R \leq TL$ | START RELEASE ACTION IMMEDIATELY WITH A CONSTANT TIME-LAG TL |
| $TL < t_c-t_R \leq B$ | START MIRROR-UP MOTION IMMEDIATELY / DEFER RUNNING OF SHUTTER BLIND UNTIL A TIMING WITH WHICH EXPOSURE IS MADE AT THE TIME $t_c$ |
| $B < t_c-t_R \leq A$ | START RELEASE ACTION AT A TIME $t_R'=t_c-TL$ (NOT START MIRROR UP MOTION IMMEDIATELY) |
| $A < t_c-t_R$ | PROHIBIT RELEASE |

AUTOMATIC FOCUSING APPARATUS

BACKGROUND OF THE INVENTION

Field of the Invention

This invention relates to an automatic focusing apparatus for use in a camera or the like.

Related Background Art

Automatic focusing apparatuses are known which drive a focusing lens of a picture taking optical system (hereinafter referred to as "taking lens") with respect to a moving subject in a pursuit or following-up driving manner without any substantial delay. In such apparatuses, the timing of starting the shutter release action is controlled as described below.

The amount of defocus when the shutter release is operated is compared with a predetermined value. If it is equal to or smaller than the predetermined value, it is determined that the taking lens can be driven to the in-focus position before the time at which exposure is started, and the release action is immediately started. If the amount of defocus is greater than the predetermined value, the start of release action is delayed by a predetermined time (as in the case of Japanese Patent Laid-Open 62-269937), or the release action start is prohibited (as in the case of Japanese Patent Laid-Open 62-269939).

In the former type of conventional automatic focusing apparatus, however, determination is made at the time of the release operation as to whether or not the taking lens can be driven so as to be focused within the release time lag (e.g., a time lag between mirror-up and the start of traveling of the shutter front curtain), and the start of release action is delayed by a predetermined time if it is determined that the lens cannot be focused. A problem may therefore be encountered in that under a condition such that the taking lens is not moved to the in-focus position even in the period of time extended by the predetermined time, a defocused picture is taken even if the release action is started after the delay time.

The latter type of conventional apparatus, in which the release action start is prohibited when the amount of defocus is greater than the predetermined value at the time of shutter release operation, entails the problem of losing a shutter chance by release prohibition in a case where the lens can be focused by slightly delaying the release action start.

SUMMARY OF THE INVENTION

An object of the present invention is to provide an automatic focusing apparatus which calculates the time when the plane on which the subject is imaged by the taking optical system will coincide with a prospective image surface in a conjugate relationship with the film surface, and which starts mirror-up or a release action such as a shutter front curtain travel so that exposure is effected when the taking system is focused.

Figure 1:
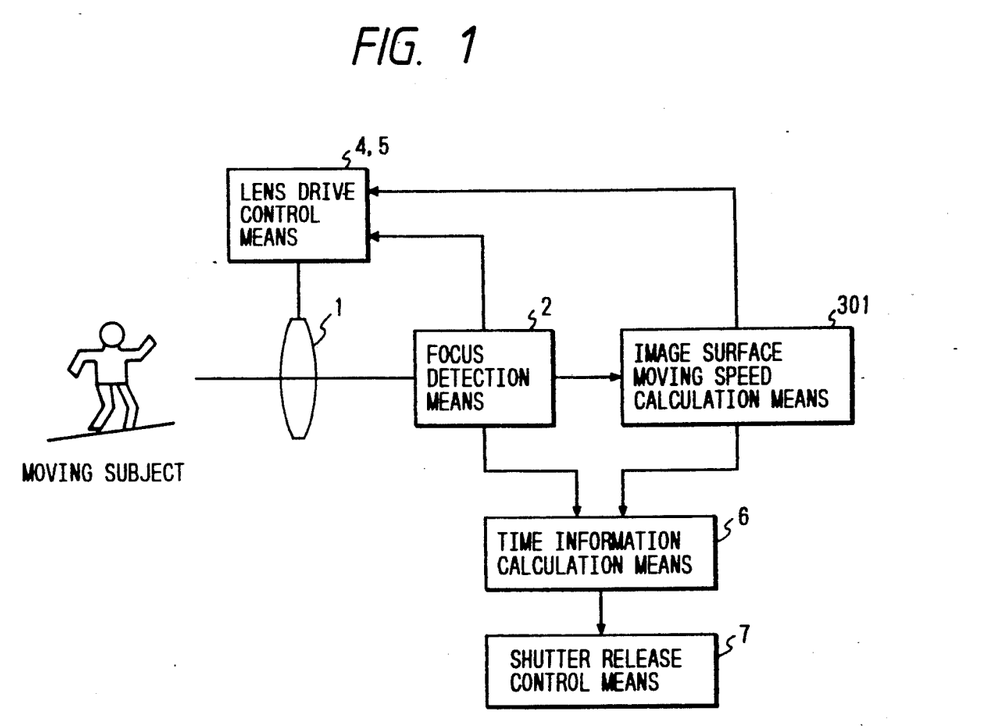
FIG. 1 is a schematic block diagram of the construction of the present invention.

The present invention will be described below schematically with reference to FIG 1. An automatic focusing apparatus in accordance with the present invention comprises a focus detection means 2 for repeatedly calculating the amount of defocus corresponding to the difference between a surface of a subject image imaged by a taking optical system 1 and a prospective image surface in a conjugate relationship with the film surface; an image surface speed calculation means 301 for calculating the speed at which the surface of the subject image imaged by the taking optical system 1 is moved with the movement of the subject based on the present and past amounts of defocus calculated by the focus detection means 2; lens drive control means 4, 5 for driving and controlling the taking optical system 1 based on the amount of defocus calculated by the focus detection means 2 and the subject image surface moving speed calculated by the image surface speed calculation means 301; a time information calculation means 6 for calculating time information indicating the time when the surface of the subject image imaged by the taking optical system 1 driven and controlled by the lens drive control means 4, 5 will coincide with the prospective image surface based on the amount of defocus calculated by the focus detection means 2 and the image surface moving speed calculated by the image surface speed calculation means 301; and a shutter release control means 7 for starting, based on the time information, the operation of a shutter release mechanism by a timing such that exposure is effected when the surface of the subject image imaged by the taking optical system 1 coincides with the prospective image surface.

The image surface speed calculation means 301 calculates the speed at which the surface of the subject image imaged by the taking optical system 1 is moved with the movement of the subject based on the amount of defocus calculated by the focus detection means 2, and the lens drive control means 4, 5 drive the taking optical system 1 based on the amount of defocus and this moving speed to follow up the moving subject.

The shutter release control means 7 starts, based on the time information calculated by the time information calculation means 6, the operation of the shutter release mechanism by a timing such that exposure is effected when the surface of the subject image imaged by the taking optical system 1 coincides with the prospective image surface. In the case of one apparatus set forth herein, the time information is calculated each time the amount of defocus is calculated by the focus detection means 2. In another apparatus set forth herein, the time information is calculated as the time or period of time starting from the time point at which the amount of defocus is calculated. Alternatively, in another apparatus set forth herein, the time information is calculated when a shutter release operation is effected. In another apparatus set forth herein, the time information is calculated as the time or period of time starting from the time when the shutter release operation is effected.

For example, in an apparatus set forth herein, the shutter release control means 7 starts shutter front curtain traveling at the time point calculated by the time information calculation means 6, at which the subject image imaged by the taking optical system 1 coincides with the prospective image surface.

In accordance with the present invention, as described above, the time at which the surface of the subject image imaged by the taking optical system coincides with the prospective image surface so that the optical system is focused is calculated, and the release action is started so that exposure is effected when the optical system is focused. The apparatus of the present invention is therefore improved in operability and is capable of taking a correctly focused picture any time.

Further, the operational feeling can be improved by starting the shutter front curtain traveling at the calculated prospective in-focus time.

For ease of understanding of the construction of the present invention, the means described above are shown with the same reference characters as those indicating the components of embodiments of the invention described below, but the present invention is not limited to the embodiments.

DESCRIPTION OF THE PREFERRED EMBODIMENTS

First Embodiment

The first embodiment of the present invention will be described below with reference to FIG. 2 which is a block diagram of the whole construction thereof.

A beam of light from a moving subject a passes through a taking optical system 1 for forming a subject image on a film surface F and is led to a finder screen S through a main mirror M. The finder screen S is ordinarily placed at a position in a conjugate relationship with the film surface F. A part of light passing through a central semitransparent portion of the main mirror M is led to a focus detection block 2 through a sub mirror SM. The main mirror M and the sub mirror SM are disposed on the optical axis of the taking optical system 1 so as to have inclinations from the optical axis except during an exposure sequence. When the exposure sequence is started, and before exposure of the film, the main and sub mirrors are moved so as to recede from the optical axis of the taking optical system 1 and, after the completion of exposure, are returned to the positions on the optical axis of the taking optical system 1.

The focus detection block 2 has a well-known construction and is constituted by a focus detecting optical system 201, a charge accumulation type image sensor 202, and a defocus amount calculation unit 203. After the completion of accumulation of charge in the image sensor 202, the amount of defocus is intermittently calculated in the defocus amount calculation section 203 based on a well-known method, e.g., the correlation calculation method proposed by the applicant of the present invention and disclosed in Japanese Patent Laid-Open No. 60-37513. The amount of defocus corresponds to the distance between the plane on which the subject is imaged and the film surface F on the optical axis of the taking optical system 1. The image sensor 202 has functions of starting accumulating charge in response to a charge accumulation start command from the defocus amount calculation unit 203 and outputting a charge accumulation completion signal to the defocus amount calculation unit 203 after finishing accumulation.

A compensation block 3 is constituted by an image surface moving speed calculation unit 301, a movement of subject discrimination unit 302, and a compensation amount calculation unit 303, and calculates the amount of compensation of driving the taking lens with the movement of the subject.

The image surface speed calculation unit 301 calculates the speed of movement of the plane on which the subject is imaged by the taking optical system 1 based on the present and past defocus amounts obtained from the focus detection block 2 through a later-described control unit 4 each time the focus detection block 2 effects focus detection.

Figure 3:
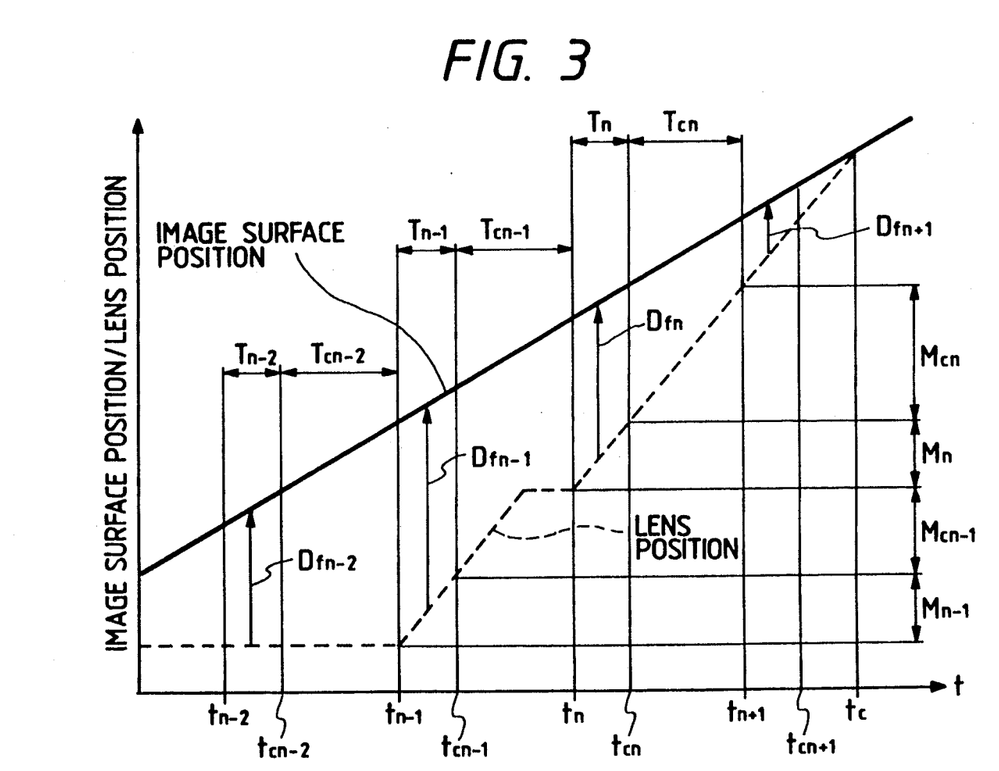
FIG. 3 is a graph of loci of the subject image surface position and the taking lens position during moving subject following driving.

FIG. 3 shows the locus of the movement of the position of the moving subject image surface formed by the taking optical system 1 and the locus of the movement of the taking lens position of the taking optical system 1 when the moving subject moves in the direction of the optical axis of the taking optical system 1. These movement loci are parallel to the time axis when the subject is stationary, or have certain inclinations from the time axis when the subject moves, as illustrated. The taking lens is focused with respect to the moving subject at a point where the locus of the movement of the moving subject image surface position and the locus of the taking lens movement coincide with each other. This focus detection system also conducts lens driving even during the period of time for accumulation of charge in the image sensor 202 and during focus detection calculation in the defocus amount calculation unit 203. (This operation is hereinafter referred to as "overlap servo".)

A method of calculating the speed at which the image surface of the taking optical system 1 is moved will be described below with reference to FIG. 3.

The speed VO at which the image surface of the taking optical system 1 is moved from the preceding focus detection time to the present focus detection time can be obtained from equation (1) as a value obtained by dividing the extent of movement of the image surface between the preceding and present focus detection times by the time interval therebetween:

$$VO = \frac{Dfn - Dfn - 1 + Mcn - 1 + (Mn - 1 + Mn)/2}{Tcn - 1 + (Tn - 1 + Tn)/2} \quad (1)$$

Dfn; the amount of defocus at the present time
Dfn-1 the amount of defocus at the preceding time
Mn: the amount of driving during the present charge accumulation period
Mn-1: the amount of driving during the preceding charge accumulation period
Mcn-1: the amount of driving during the preceding calculation
Tcn-1: the preceding calculation time
Tn: the present charge accumulation time
Tn-1: the preceding charge accumulation time The movement of subject discrimination unit 302 discriminates whether or not the subject is moving based on the speed VO of movement of the image surface of the taking optical system 1 obtained by the image surface speed calculation unit 301. The image surface moving speed VO is to be zero when the subject is stationary but is, actually, not always zero owing to a detection error or the like. Then, it is assumed that the subject is moving when the absolute value of VO is equal to or greater than Vexp and when the ratio VO/VO' of VO and the preceding image surface moving speed VO' is greater than a predetermined value. Further, to inhibit calculation of an erroneous value of image surface moving speed VO due to a deviation of the subject from the distance metering frame, the process is arranged to recognize the deviation of the subject when VO/VO' is equal to or greater than a predetermined value. These conditions are expressed by the following inequalities:

$$|VO| \geq V\text{exp and}$$

$$r < \left| \frac{VO}{VO'} \right| < k \quad (2)$$

r, k, Vexp: predetermined constants.

When inequalities (2) are satisfied, it is determined that the subject is moving or, when they are not satisfied, it is determined that the subject is not moving. The constant r may be set to 0.3 to 0.8 and the constant k may be set to 3 to 6.

When the movement of subject discrimination unit 302 discriminates the movement of the subject, the compensation amount calculation unit 303 calculates a predicted value X of the amount of defocus at the time of completion of present calculation (hereinafter referred to as "prospective amount of defocus") and the amount of compensation ΔV of the speed of movement of the subject image surface by equations (3) and (4):

$$X = Dfn + \left( \frac{1}{2} Tn + Tcn \right) VO - \left( \frac{1}{2} Mn + Mcn \right) \quad (3)$$

$$\Delta V = VO \Delta T \quad (4)$$

ΔT designates constant time intervals at which the prospective amount of defocus X is corrected as the subject moves.

When the subject is moving, the control unit 4 controls a lens drive unit 5 based on the prospective amount of defocus X from the compensation block 3 to drive the taking lens of the taking optical system 1, and interrupts the driving operation at the constant time ΔT to add or subtract the amount of compensation ΔV of the subject image surface moving speed to or from the prospective amount of defocus X, thereby effecting compensation to follow up the moving subject with accuracy. When the subject is stationary, the control unit 4 controls the lens drive unit 5 based on the amount of defocus from the defocus amount calculation unit 203 to control and drive the taking lens to the in-focus position. The control unit 4 also controls the operation of an in-focus time calculation unit 6, a release control unit 7, an indication unit 8, a memory 10 and a counter 11 described later.

The lens drive unit 5 drives the taking lens by a pulse motor (not shown). The extent of driving is set in a counter provided in the lens drive unit 5 with respect to the extent of movement of the taking lens per pulse determined by the driving system. The absolute value of this counter is subtracted as the taking lens is moved toward the target position by the rotation of the pulse motor. When the counter values becomes zero, the pulse motor is stopped. The pulse motor is rotated in a normal or reverse direction according to the plus/minus sign of value set in the counter, thereby driving the taking lens forward or rearward.

The in-focus time calculation unit 6 calculates the in-focus time tc at which the plane on which the subject is imaged by the taking optical system 1 coincides with the predetermined imaging surface in a conjugate relationship with the film surface F by equation (5):

$$tc - torg = Df/(V_L - VO) \quad (5)$$

torg: the time at which taking lens driving is started
Df: the amount of defocus at the time torg
VL: the speed at which the taking lens is driven.
For calculation when the subject is stationary, VO=O is used.

The release control unit 7 controls, when a shutter release 9 is operated, the operation of the release mechanism so that the exposure start time coincides with the in-focus time tc. The release mechanism includes a mirror up/down mechanism, shutter front and rear curtains, mechanisms for driving the curtains and other components. "Release action" hereinafter referred to denotes a sequential operation of these mechanisms and elements.

The operation of the release mechanism will be described below with reference to FIG. 4.

Figure 4:
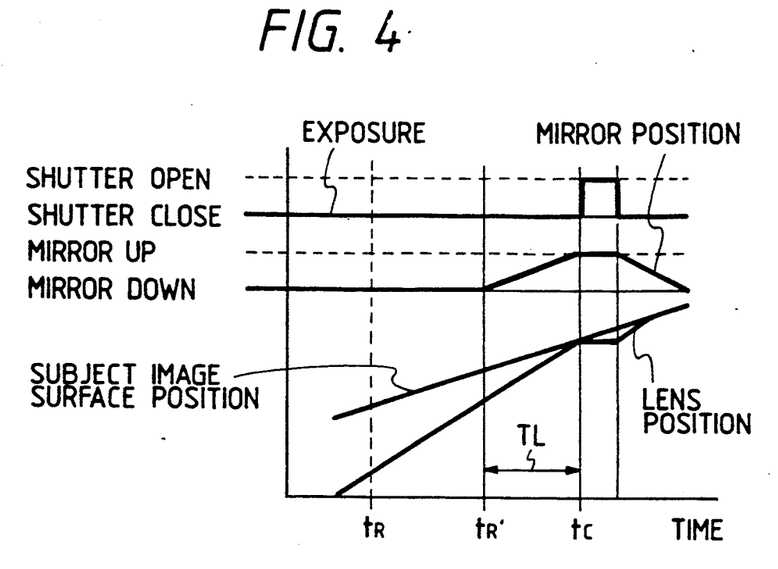
FIG. 4 is a graph of the mirror position, the exposure timing, the lens position and the subject image surface position when the shutter release is operated.

FIG. 4 is a time chart showing the positions of the mirrors M and SM, exposure timing, the taking lens position and the subject image surface position at a time $t_R$ when the shutter release 9 is operated.

A shutter release operation is effected at the time $t_R$, and the release control unit 7 then operates to effect mirror-up of the mirrors M and SM so that these mirrors recede from the optical axis of the taking optical system 1, and to make the shutter front curtain travel after the completion of mirror-up. The period of time between the moment at which mirror-up is started and the moment at which the shutter front curtain starts traveling (hereinafter referred to as reference release time lag TL) is constant in each camera. If ($t_R$+TL)<tc, and if the release action is started at the time $t_R$, exposure is started at the time ($t_R$+TL) before the in-focus time tc, resulting in a defocused state of the photograph. If the release action is started at the time $t_R'$ which is determined by $t_R' + TL = tc$, a correctly focused picture can be taken. Thus even if the shutter release 9 is operated at the time $t_R$, the release action start is delayed to the time $t_R'$. Since the taking lens is driven by an overlap servo, the taking lens is constantly maintained in a focused state by following the moving subject after the in-focus time tc. Consequently, when $(t_R + TL) \geq tc$, a correctly focused picture can be taken irrespective of the time at which the release action is started.

Figure 5:
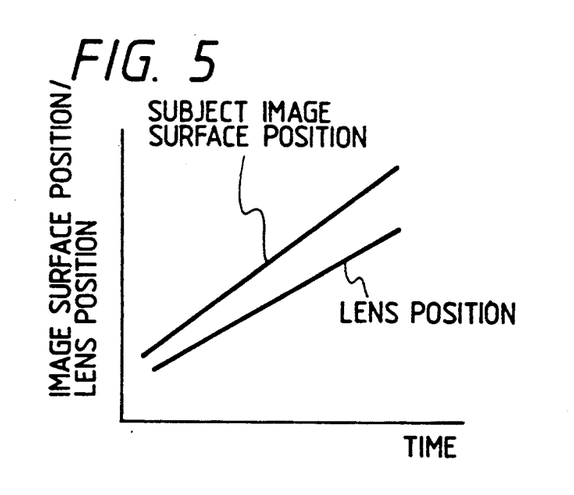
FIG. 5 is a graph showing a state in which the subject image surface position cannot be followed up by driving the taking lens even at the maximum speed.

However, in a case where the speed of movement of the moving subject is so high that it is not possible to follow the subject even by driving the taking lens at the maximum speed as shown in FIG. 5, the value of (tc−torg) calculated by equation (5) is negative. It is also possible that (tc−torg) will become considerably longer than the reference release time lag TL while being positive. If the time for focusing is long as in these cases, the release action is prohibited. In such an event, the control of the system is such that the release action is prohibited when the value of tc−TR is greater than a predetermined value A. The release operation conditions and the operation contents described above are collectively shown in FIG. 6. The predetermined value A is set to about TL to 2TL or may be longer in the case of setting the accuracy with priority or shorter in the case of setting the speed with priority.

The indication unit 8 indicates an exposure-enabled state on the finder S after the reference release time lag TL or informs the operator of this state by buzzing or the like, when the time (tc−t) between the present time t and the in-focus time tc calculated by the in-focus time calculation unit 6 satisfies $0 \leq (tc−t) \leq TL$.

The memory 10 includes a memory 10 (Tcn-1) for storing the time calculated at the preceding time, a memory 10 (Mcn-1) for storing the amount of driving of the taking lens during the preceding calculation time, memories 10 (Tn-1), 10 (Tn) for storing the preceding and present charge accumulation times, memories 10 (Mn-1), 10 (Mn) for storing the amounts of taking lens driving during the preceding and present charge accumulation times, memories 10 (VO'), 10 (VO) for storing the preceding and present subject image surface moving speeds, memories 10 (Dfn-1), 10 (Dfn) for storing the preceding and present amounts of defocus, and memories 10 (tn), 10 (tcn) for storing the taking lens positions before and after charge accumulation. As new data is supplied to these memories, newest data is stored in the present data storing memories while the data stored as present data is transferred to the preceding data storing memories.

The counter 11 includes a timer counter Cl for measuring the time for charge accumulation in the image sensor 202 and the time for focus detection calculation, a counter C2 for measuring the amount of driving of the taking lens, a timer counter C3 for effecting drive amount compensation interruption, a timer counter C4 for measuring the in-focus time, and a counter C5 for effecting release interruption.

Figure 7B:
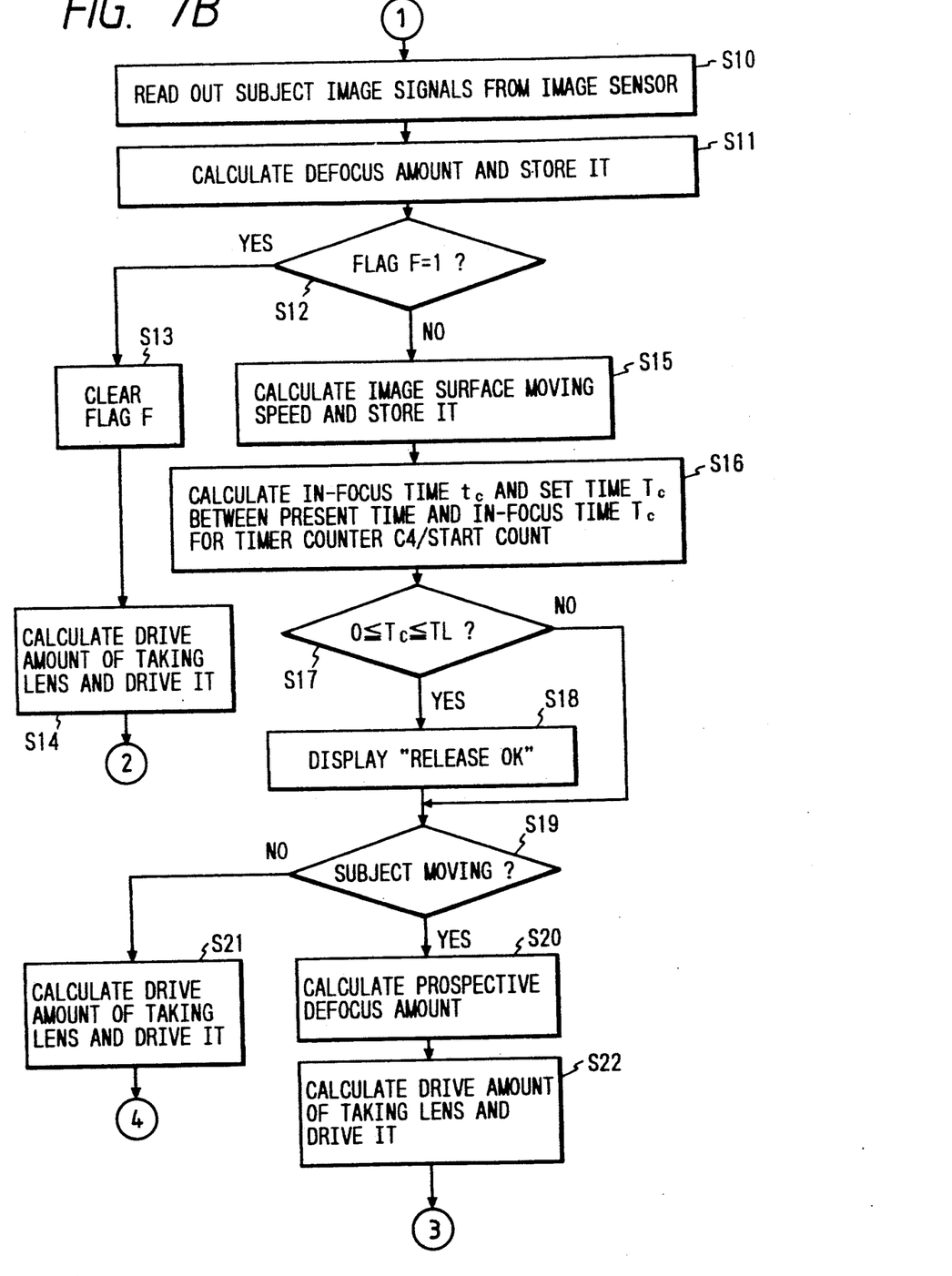
FIGS. 7 is a flow chart of a program for a microcomputer of the first embodiment.
Figure 7C:
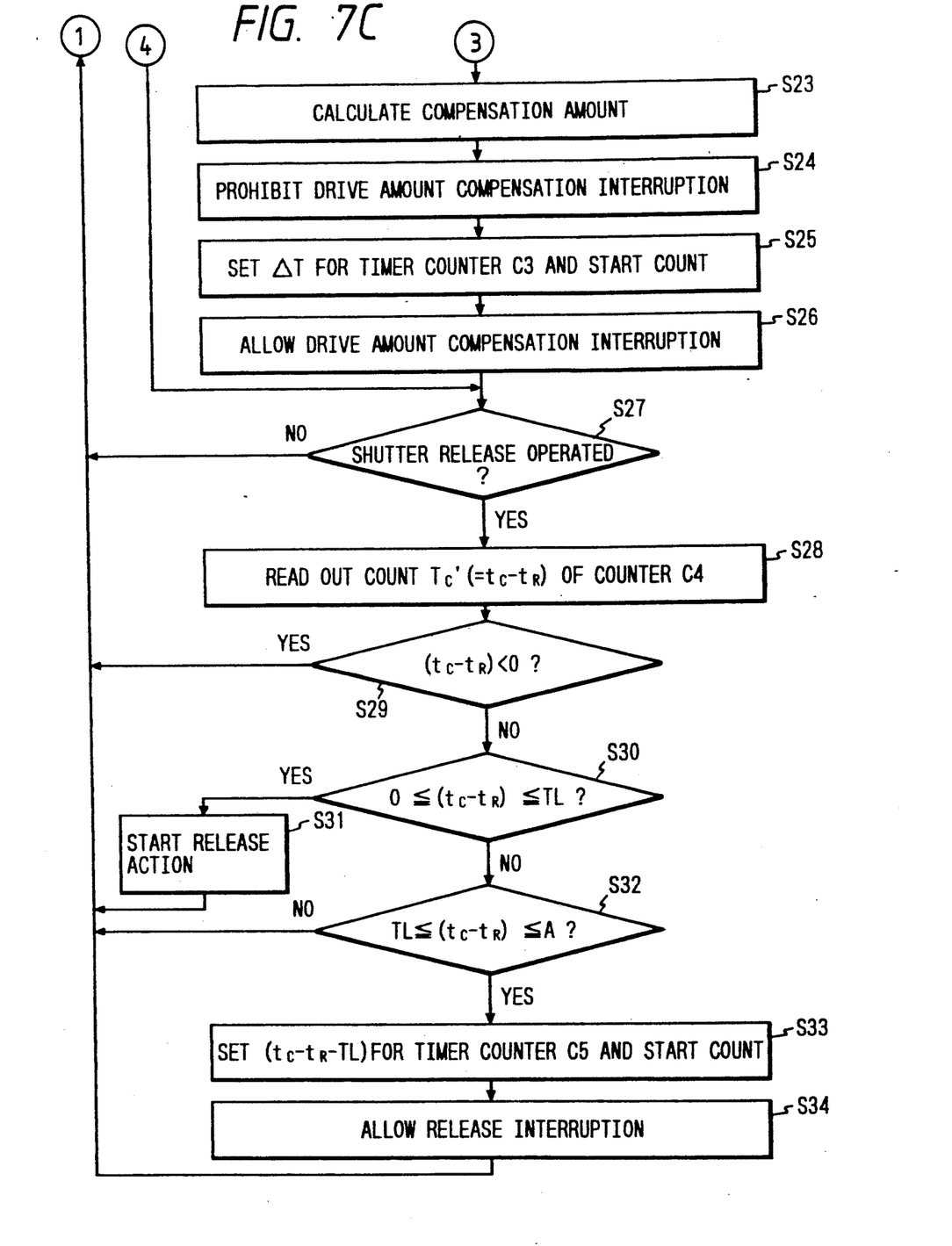

The defocus amount calculation unit 203, the compensation block 3, the control unit 4, the in-focus time calculation unit 6 and the timer counter 11 described above are operated with a microcomputer by the process in accordance with the program shown in FIG. 7. The operation of the first embodiment will be described below with reference to FIG. 7.

The microcomputer starts executing the program shown in FIG. 7 when an AF mode switch (not shown) is operated to select a continuous AF servo mode, i.e., an automatic following mode (hereinafter referred to as "C-AF mode").

In step S1, initialization is effected. That is, the counters Cl to C5 are reset and a flag F is set. Also, drive amount compensation interruption and release interruption are prohibited. In step S2, determination is made as to whether or not the AF mode switch is at the C-AF mode position. If the present mode is C-AF mode, the process proceeds to step S3 to effect automatic following mode processing. If the switch is changed over to select a different mode, the process proceeds to step S4 to stop driving the taking lens through the lens drive unit 5, and the process returns to the main program.

For ease of understanding of the operation of this automatic focusing apparatus, the operation from the time tn shown in FIG. 3 will be described below. The time referred to as the present time with respect to each of the following steps is the time at which the operation of the corresponding step is performed. In step S3, the present value of the timer counter Cl is read out and is stored as the preceding calculation time Tcn-1 in the memory 10 (Tcn-1). Thereafter, the timer counter Cl is cleared and is made to start counting again. The process then proceeds to step S5, the value of the counter C2 is read out, and this value is stored in the memory 10 (tn) as the taking lens position M(tn) before the start of charge accumulation. Further, the amount Mcn-1 of driving of the taking lens during the preceding calculation time is calculated by the following equation and is stored in the memory 10 (Mcn-1).

$$Mcn-1 = M(tn) - M(tcn) \quad (6)$$

M(tn): the value of the counter C2 at the start of charge accumulation

M(tcn): the value of the counter C2 at the end of charge accumulation.

In step S6, a charge accumulation start command is output to the image sensor 202 to start photoelectric conversion. In step S7, output of a charge accumulation completion signal is awaited. When the charge accumulation completion signal is received, the process proceeds to step S8, and the present value of the timer counter Cl is read out and is stored in the memory 10 (Tn) as the present charge accumulation time Tn. Thereafter, the timer counter Cl is cleared and is made to start counting again. In step S9, the value of the counter C2 is read out and is stored in the memory 10 (Tcn). Further, the amount Mcn of driving of the taking lens during the present charge accumulation time is calculated by the following equation and is stored in the memory 10 (Mn).

$$Mn = M(tcn) = M(tn) \quad (7)$$

In step S10, a pair of subject image signals are read out from the image sensor 202 and, in step S11, the amount of defocus Dfn is calculated based on these signals and is stored in the memory 10 (Dfn). The process then proceeds to step S12 to determine whether or not flag F is set. Since there is no past data accumulated for calculation of the moving subject image surface speed immediately after the moment when the C-AF mode is selected, lens driving based on the amount of defocus calculated at the initial time alone is performed and the process returns to step S2. If flag F is set, the process proceeds to step S13 to clear this flag and, in step S14, the amount of driving of the taking lens is calculated based on the amount of defocus calculated at the initial time and is output to the lens drive unit 5. The lens drive unit 5 sets this amount of lens driving its the counter and starts the pulse motor to drive the taking lens. The process thereafter returns to step S2.

If it is determined in step S12 that flag F is not set, the process proceeds to step S15 to calculate the subject image surface moving speed VO by the above-mentioned equation (1) and to store this speed in the memory 10 (VO). In step S16, the time Tc from the present time to the in-focus time tc is calculated by the above-mentioned equation (5) and is set in the timer counter C4, and the counter C4 is made to start counting. The timer counter C4 is a counter for down-counting with respect to time, and the value thereby counted becomes zero at the in-focus time.

In step S17, determination is made as to whether or not $0 \leq Tc \leq TL$. If this inequality is satisfied, the process proceeds to step S18, a display of, for example, "OK" is made on the finder S through the indication unit 8 to inform the operator that a correctly focused picture can be taken by operating the shutter release 9 any time. If it is determined in step S17 that the inequality is not satisfied, step S18 is skipped.

In step S19, determination is made with the above-mentioned inequalities (2) as to whether or not the subject is moving. If the subject is moving, the process proceeds to step S20 or, if the subject is stationary, the process proceeds to step S21. In step S20, the prospective amount of defocus X is calculated from equation (3) and, in step S22, the amount of defocus X is converted into the amount of driving of the taking lens which is output to the lens drive unit 5. The lens drive unit 5 sets this amount of lens driving in its counter and drives the taking lens.

In step S23, the amount of compensation of the moving speed of the subject image surface, i.e., the amount of compensation $\Delta V$ of driving of the taking lens with the movement of the subject is calculated from equation (4). This taking lens drive compensation is effected by interruption at each predetermined time $\Delta T$, i.e., a later-described interruption routine such that $\Delta V$ is added to or subtracted from the value of the counter of the lens drive unit 5. In step S24, drive amount compensation interruption is prohibited and, in step S25, the predetermined time $\Delta T$ is set in the time counter C3 for effecting drive amount compensation interruption, and this timer counter is made to start counting. Drive amount compensation interruption is allowed in step S26 and the process then proceeds to step S27.

If it is determined in step S19 that the subject is stationary, the process proceeds to step S21 since there is no need to compensate the amount of driving of the taking lens. The amount of driving of the taking lens is calculated based on the amount of defocus Dfn calculated in step S11 and is output to the lens drive unit 5. The lens drive unit 5 sets this amount of lens driving in its counter and drives the taking lens. The process thereafter proceeds to step S27.

Figure 6:
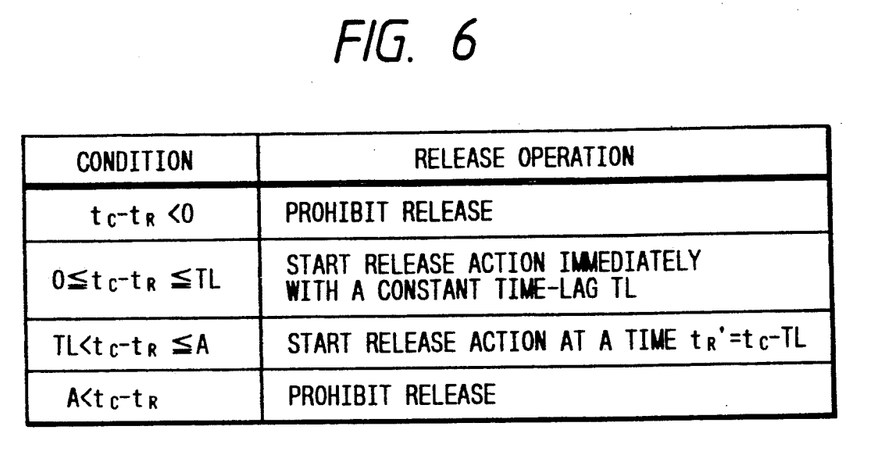
FIG. 6 is a chart of release operation conditions and operation contents of the first embodiment.

In step S27, determination is made as to whether or not the shutter release 9 has been operated. If it has been operated, the process proceeds to step S28 or, if it has not been operated, the process returns to step S2. In step S28, the value of the timer counter C4 is read out. At this time, the count value of the counter C4 is Tc' down-counted from Tc set in step S16 and designates the above-mentioned $(tc-t_R)$. In step S29, determination is made as to whether or not $(tc-t_R)<0$. If YES, the process returns to step S2 without effecting the release action as shown in FIG. 6. If NO, determination is made in step S30 as to whether or not $0 \leq (tc-t_R) \leq TL$. If YES, a release action start Command is Output to the release Control unit 7 in step S31. That is, the taking lens is driven to the in-focus position and is stopped before the time TL is reached, and exposure is effected at the corresponding time to take a correctly focused picture. If NO in step S30, the process proceeds to step S32 to determine whether or not $TL<(tc-t_R)<A$. If YES, the process proceeds to step S33, the time $(tc-t_R- TL)$, i.e., the time $t_R'$ is set in the timer counter C5, and the counter C5 is made to start counting. In step S34, release interruption is allowed. That is, the release action is started by a later-described release interruption routine at the above-mentioned time $t_R'-(tc-TL)$ indicated in FIG. 4. The result of determination of step S32 is NO when $A<(tc-t_R)$ as shown in FIG. 6. In this case the process returns to step S2.

Figure 8:
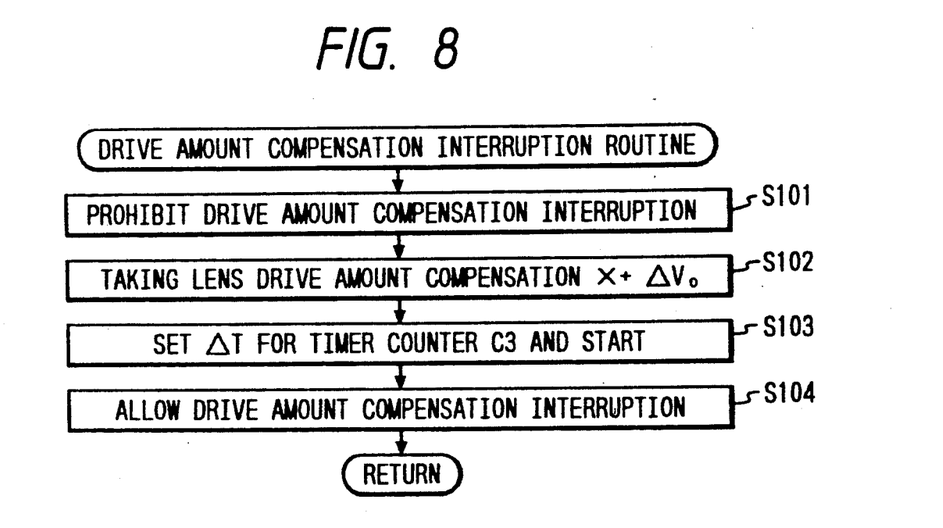
FIG. 8 is a flow chart of a drive amount compensation interruption routine of the program shown in FIG. 7.

FIG. 8 is a flow chart of the interruption routine executed by drive amount compensation interruption. This routine is executed by time-up of the timer counter C3.

In step S101, drive amount compensation interruption is prohibited. The process then proceeds to step S102 to convert the amount of compensation $\Delta V$ into the amount of driving of the taking lens and to output this to the lens drive unit 5. The lens drive unit 5 adds this amount of drive compensation to the present count value. In step S103, predetermined time $\Delta T$ is set in the timer counter C3. Drive amount compensation is allowed again in step S104 and the process then returns.

Figure 9A:
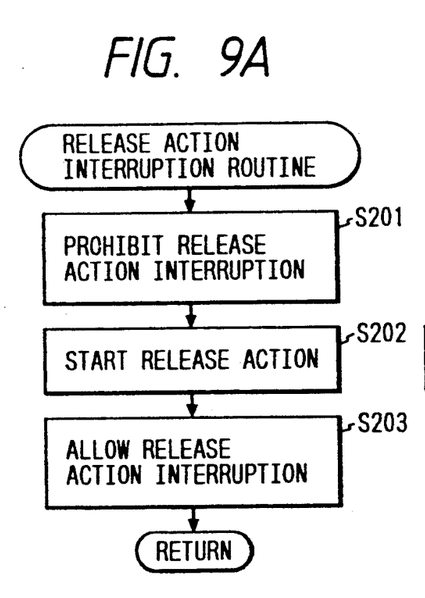
FIGS. 9A and 9B are flow charts of a release interruption routine of the program shown in FIG. 7.

FIG. 9A is a flow chart of the release action interruption. This interruption is effected by time-up of the timer counter C5.

In step S201, release action interruption is prohibited. In step S202, a release action start command is output to the release control unit 7 to start the release action. That is, the taking lens is driven to the in-focus position and is stopped before the time TL is reached, and exposure is effected at the corresponding time to take a correctly focused picture. Release action interruption is allowed again in step S203, and the process then returns.

In accordance with the first embodiment, as described above, the time tc at which the taking lens is focused while being driven to follow up the moving subject is calculated and the time at which the release action is started is set to the time $(tc-TL)$ the reference release time lag TL before the in-focus time tc. It is therefore possible to effect exposure at the in-focus time tc and to take a correctly focused picture. If a picture-taking-enabled state is detected during the operation of following the moving subject, a display indicating this situation is made on the finder. Further, if a substantially long time is required to focus the lens, the shutter release is prohibited. Thus, the apparatus is thereby improved in handling and is capable picking up the moving subject with reliability.

Second Embodiment

Figure 10:
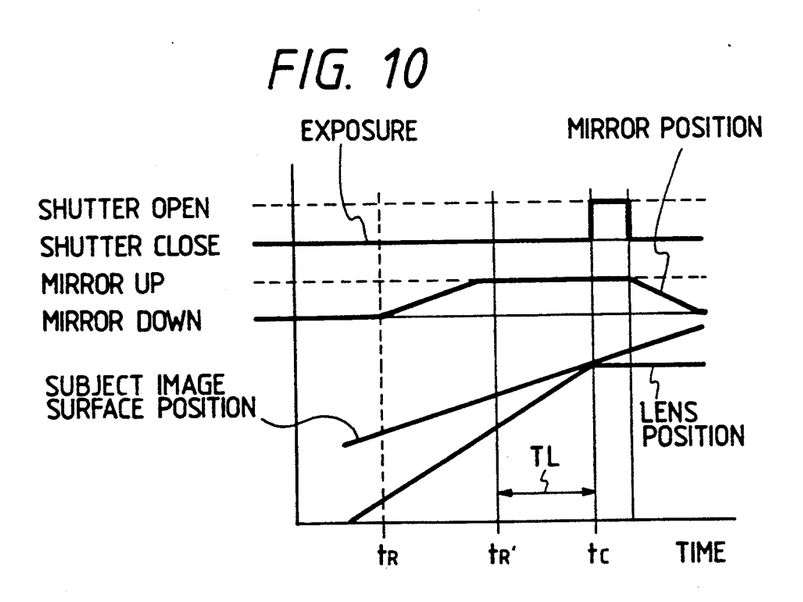
FIG. 10 is a graph of the mirror position, the exposure timing, the lens position and the subject image surface position when the release action timing is controlled before shutter front curtain traveling.

In the second embodiment, as shown in FIG. 10, the mirror-up operation is performed immediately after the shutter release operation, is started but the shutter front curtain is not made to travel immediately after the completion of the mirror-up operation; the shutter front curtain traveling is delayed so that exposure is effected at the in-focus time tc. That is, while timing control is effected before the start of mirror-up operation in the first embodiment, timing control is effected before shutter front curtain traveling in this embodiment.

If such release control is adopted, the period of image disappearance time when the subject image cannot be seen through the finder because of mirror-up is increased by $(tc - t_R - TL)$, but the mirror-up operation is started immediately after the shutter release operation, so that the operator has a preferable feeling of shutter release operation. However, an adverse effect may be experienced if the image disappearance time is excessively increased. The shutter release is therefore prohibited when the image disappearance time is longer than a predetermined time. The release operation conditions and the operation contents described above are collectively shown in FIG. 11.

Figure 2:
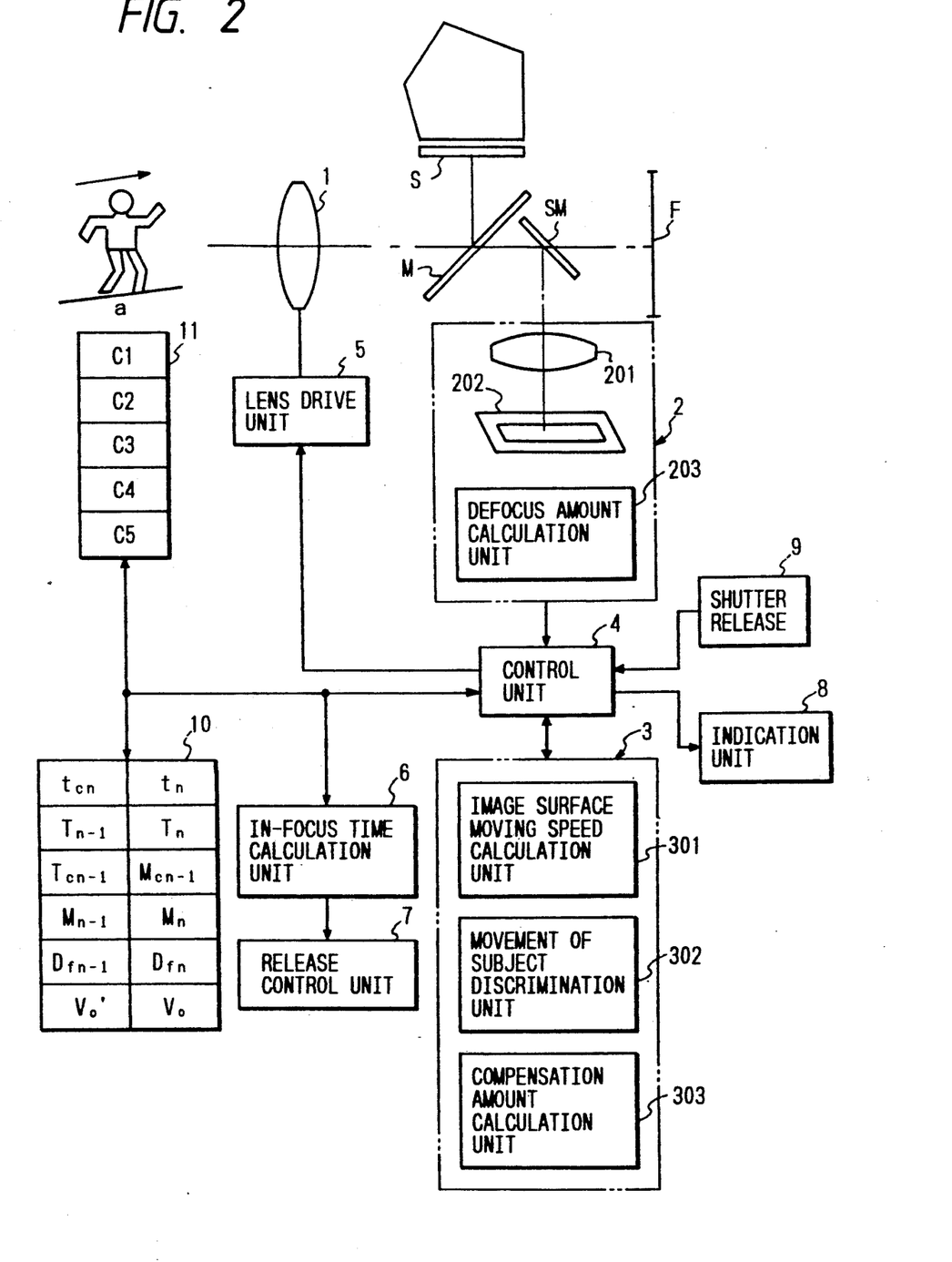
FIG. 2 is a block diagram of the overall construction of a first embodiment of the present invention.
Figure 9B:
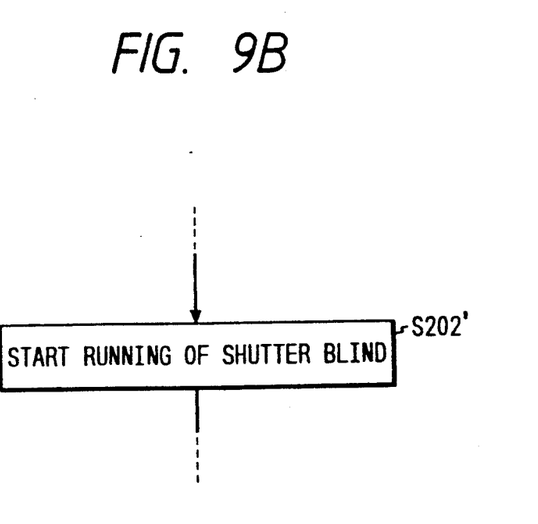
Figure 12:
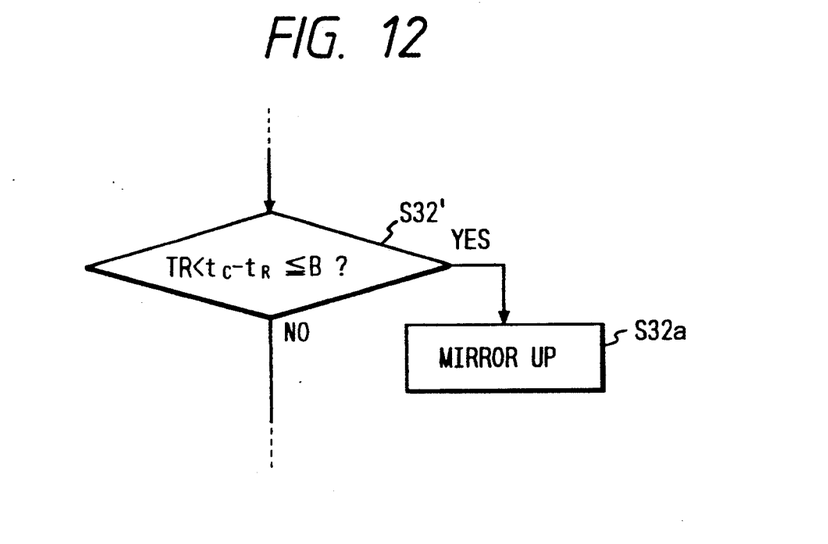
FIG. 12 is a diagram of a change in the microcomputer program shown in FIG. 7 in the case of using this program for the second embodiment.

An automatic focusing apparatus in accordance with the second embodiment can be realized by using the same construction as the first embodiment shown in FIG. 2. The program used for this embodiment may be the same as that shown in FIGS. 7 to 9a except that step 32 of FIG. 7 is replaced with steps S32' and 32a shown in FIG. 12, and that step S202 of FIG. 9A is replaced with step S202' shown in FIG. 9B.

Figure 11:
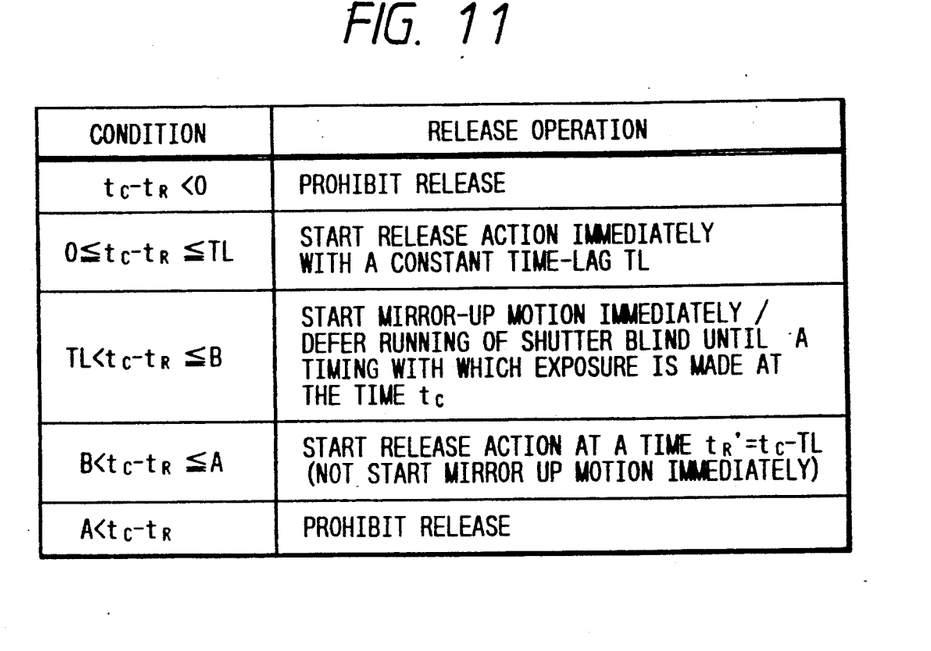
FIG. 11 is a chart of release operation conditions and operation contents of a second embodiment.

A predetermined value B used in the step S32' and shown in FIG. 11 may, preferably, be set to 150 ms at the maximum by considering the fact that the reference time lag TL is ordinarily 50 to 100 ms. Since the predetermined value cannot be set to a substantially large value for this reason, the possibility of release prohibition is increased in this embodiment. To cope with this problem, a method based on a combination of the first and second embodiments may be used as a modification. That is, predetermined values A and B are set so that A>B, and, if $TL<(tc-t_R)\leq B$, the mirror-up operation is immediately started and only the front curtain traveling timing is controlled, or if B $(tc-t_R)\leq A$, the mirror-up operation is not immediately started and the timing of starting the release action including the mirror-up operation is controlled, or if $A<(tc-t_R)$, shutter release is prohibited.

Thus, in the second embodiment, the mirror-up operation is started immediately after the shutter release, and traveling of the shutter curtain is controlled and delayed so that exposure is effected at the in-focus time tc, thereby enabling a further improvement in operational feeling.

Figure 13:
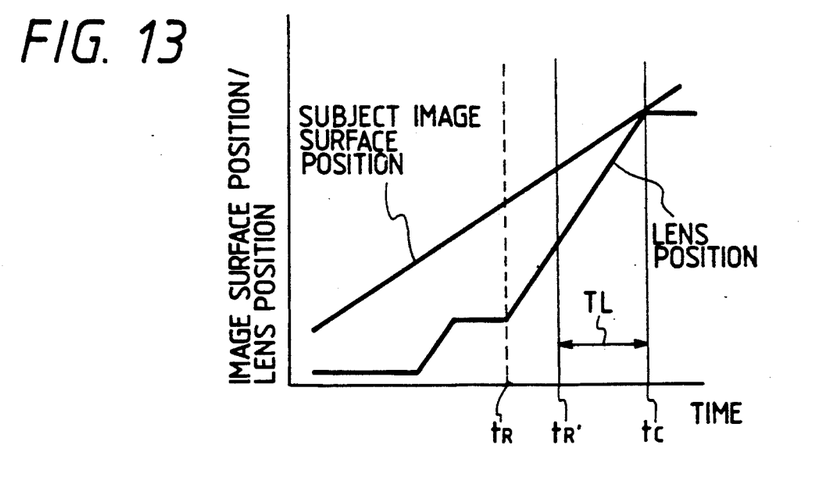
FIG. 13 is a modification of the second embodiment in which the in-focus time is calculated to follow up the moving subject, only when the shutter release is operated.

In the above-described first and second embodiments, the in-focus time tc is calculated each time focus detection is effected. However, the in-focus time may be calculated only when the shutter release 9 is operated. That is, as shown in FIG. 13, the taking lens is driven in a step manner until the shutter release 9 is operated, and is driven immediately to the target position when the shutter release 9 is operated.

For this control, the amount of defocus $Df_R$ when the shutter release 9 is operated is first calculated and the in-focus time tc is calculated by the following equation based on the amount of defocus $Df_R$ and the image surface moving speed VO:

$$tc - t_R = Df_R/(V_L - VO) \quad (8)$$

When $(tc-tR)<0$, shutter release is prohibited, or when $0\leq(tc-tR)\leq TL$, the image surface position at the time $(t_R+TL)$ is calculated, the taking lens is driven to this position and exposure is effected at the time $(t_R+TL)$. When $TL<(tc-t_R)\leq A$, the subject image surface position at the time tc is calculated, the taking lens is driven to this position, mirror-up is started at the time $(tc-TL)$ and exposure is effected at the time tc. When $A<(tc-t_R)$, shutter release is prohibited. The predetermined value A is the same as that used in the first embodiment. Timing control of shutter curtain traveling may also be effected as in the case of the second embodiment.

In the above-described first and second embodiments, the subject image surface position is approximated by a linear function to calculate the in-focus time. However, a quadratic or higher-degree function may be used for this approximation. An example of approximation of the subject image surface position with a quadratic function will be described below with reference to FIG. 14.

Figure 14:
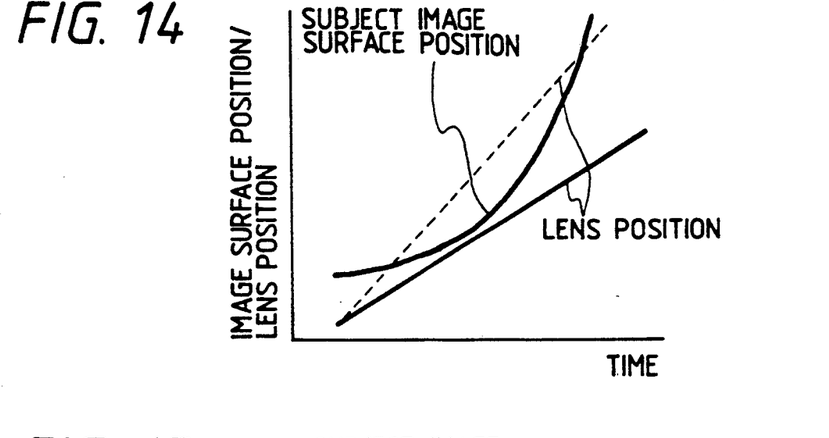
FIG. 14 is a graph of approximation of the subject image surface position with a quadratic function.

The control unit 4 approximates the subject image surface position with a quadratic function $Y=at^2+bt+c$, calculates the coefficients a, b, and c, and drives the taking lens so that the taking lens is set to the position designated by $atc^2+btc+c$ at the time tc. The in-focus time calculation unit 6 calculates the in-focus time tc assuming that the taking lens has been driven from the time torg. The positions of the taking lens and the subject image surface at the time $(torg+t')$ are expressed by the following equations:

$$Y = V_L t' + d: \text{Taking lens}$$

$$Y = a(t' + torg)^2 + b(t'T + torg) + c: \text{Subject} \quad (9)$$

In accordance with these equations, the in-focus time tc is a root of the following quadratic function (10):

$$atc^2+(2atorg+b-V_L)tc+atorg^2+btorg+c-d=0 \quad (10)$$

If this equation has no real root, the positions of the lens and the subject image surfaces are as indicated by the solid lines in FIG. 14, the in-focus time tc cannot be calculated, and shutter release is therefore prohibited. If there are two real roots satisfying $(tc-torg)>0$, one of them determining a smaller value of $(tc-torg)$ is selected as the in-focus time tc. The release action is controlled by the release control unit 7 based on this in-focus time tc. If there is no root satisfying $(tc-torg)>0$, shutter release is prohibited.

Figure 15:
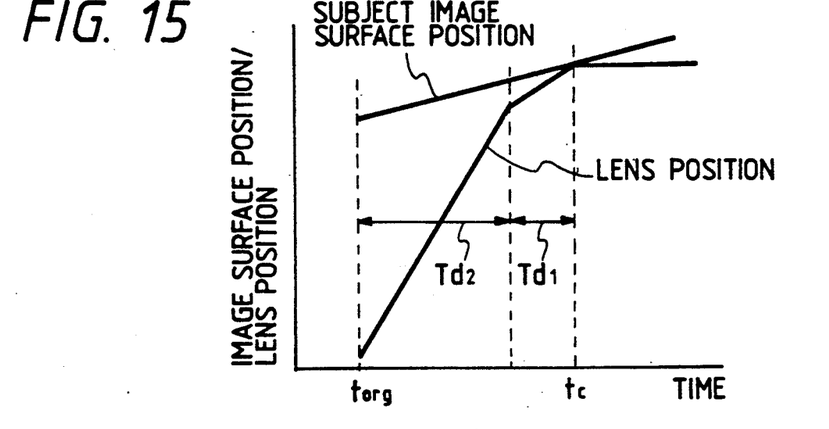
FIG. 15 is a graph of following-up of the subject image surface position based on driving the lens while changing the lens drive speed two steps.

In the above-described embodiments, the taking lens driving speed is constant. Alternatively, the lens may be driven while changing the speed in steps. For such lens driving, lens drive unit and the in-focus time calculation unit 6 different from those in the arrangement of the above-described embodiments are used. The operations of these units are as described below.

The lens drive unit 5 drives the taking lens at a speed S1 when the remainder of its internal lens drive amount setting counter is equal to or smaller than a predetermined value D1, or at a speed S2 $(>S1)$ when the remainder is greater than the predetermined value D1. The in-focus time calculation unit 6 calculates the time Td1 for driving at the speed S1 and the time Td2 for driving at the speed S2 by equations (11):

$$Td1 = \frac{D1}{S2 - VO} \quad (11)$$

$$Td2 = \frac{Df - D1}{S2 - VO}$$

Df: the lens drive amount setting counter value corresponding to the amount of defocus when driving is started at speed S2

S1, S2: taking lens driving speeds (S1<S2)

VO: subject image surface moving speed.
Accordingly, the in-focus time tc is expressed by equation (12):

$$tc = torg + Td1 + Td2 \quad (12)$$

torg: the time at which driving is started at speed S2.

Equations (11) and (12) are used in the case where $|Df| > |D1|$. If $|Df| < |D1|$, the lens driving speed is not changed till the in-focus time tc, and the driving speed may be calculated in the same manner as the first embodiment.

The method of changing the lens driving speed two steps has been described. However, the speed may be changed N steps. If the lens driving speed is changed m steps ($1 \leq m \leq N$) before the in-focus time tc, the in-focus time is expressed by the following equations:

$$Tdm = \frac{Df - Dm}{Sm - VO} \quad (13)$$

$$Tdm - 1 = \frac{Dm - Dm - 1}{Sm - 1 - VO}$$

$$Td1 = \frac{D1}{S1 - VO}$$

$$tc = torg + \sum_{p=1}^{m} Tdp$$

Df: the lens drive amount setting counter value corresponding to the amount of defocus when driving is started at speed Sm Sm . . . S1: taking lens moving speed (Sm > Sm-1 > . . . S1

That is, the release action is controlled based on the in-focus time tc calculated by equation (13).

What is claimed is:

1. An automatic focusing apparatus comprising:
   focus detection means for repeatedly calculating an amount of defocus corresponding to the difference between a surface of a subject image imaged by a taking optical system and a prospective image surface in a conjugate relationship with a film surface;
   image surface speed calculation means for calculating speed at which the surface of the subject image imaged by the taking optical system moves with the movement of the subject on the basis of present and past amounts of defocus calculated by said focus detection means;
   lens drive control means for driving and controlling the taking optical system on the basis of said amount of defocus calculated by said focus detection means and speed of the subject image surface calculated by said image surface speed calculation means, wherein the driving and the controlling of the taking optical system continue after a shutter release operation is started;
   time information calculation means for calculating time information indicating the time when the surface of the subject image imaged by the taking optical system will coincide with the prospective image surface on the basis of said amount of defocus, said speed of the image surface and drive speed of the taking optical system driven and controlled by said lens drive control means; and
   shutter release control means for starting, based on the time information, the action of shutter release mechanism by such a timing that exposure is effected when the surface of the subject image imaged by the taking optical system coincides with the prospective image surface.

2. An automatic focusing apparatus according to claim 1, wherein said time information calculation means calculates the time information each time the amount of defocus is calculated by said focus detection means.

3. An automatic focusing apparatus according to claim 2, wherein the time information calculated by said time information calculation means includes the time or period of time starting from the time point at which the amount of defocus is calculated by said focus detection means.

4. An automatic focusing apparatus according to claim 1, wherein said time information calculation means calculates the time information when a shutter release operation is effected.

5. An automatic focusing apparatus according to claim 4, wherein the time information calculated by said time information calculation means includes the time or period of time starting from the time when the shutter release operation is effected.

6. An automatic focusing apparatus according to claim 1 wherein, if the time information calculated by said time information calculation means is shorter than time-lag between start of shutter release operation and start of exposure, said shutter release control means starts the action of said shutter release mechanism at once when said shutter release operation is started.

7. An automatic focusing apparatus according to claim 1 wherein, if the time information calculated by said time information calculation means is shorter that time-lag between start of shutter release operation and start of exposure and longer than a predetermined time which is longer than said time-lag, said shutter release control means suspends the action of said shutter release mechanism for a time interval calculated by subtracting said time-lag from said time information, and thereafter start the action of said shutter release mechanism.

8. An automatic focusing apparatus according to claim 1 wherein, if the time information calculated by said time information calculation means is longer than a predetermined time which is longer than time-lag between start of shutter release operation and start of exposure, said shutter release control means does not start the action of said shutter release mechanism even when said shutter release operation is started.

9. An automatic focusing apparatus according to claim 1 wherein, if the time information calculated by said time information calculation means is negative, said shutter release control means does not start the action of said shutter release mechanism even when said shutter release operation is started.

10. An automatic focusing apparatus according to claim 1, further comprising display means for displaying the state of said shutter release control means in a finder based on the result of calculation effected by said time information calculation means.

11. An automatic focusing apparatus comprising:
    focus detection means for repeatedly calculating an amount of defocus corresponding to the difference between a surface of a subject image imaged by a taking optical system and a prospective image surface in a conjugate relationship with a film surface;
    image surface speed calculation means for calculating speed at which the surface of the subject image imaged by the taking optical system moves with the movement of the subject on the basis of present and past amounts of defocus calculated by said focus detection means;

lens drive control means for driving and controlling the taking optical system on the basis of said amount of defocus calculated by said focus detection means and speed of the subject image surface calculated by said image surface speed calculation means, wherein the driving and the controlling of the taking optical system continue after a shutter release operation is started;

time information calculation means for calculating time information indicating the time when the surface of the subject image imaged by the taking optical system will coincide with the prospective image surface on the basis of said amount of defocus, the speed of said image surface and drive speed of the taking optical system driven and controlled by said lens drive control means; and shutter release control means for immediately starting a mirror-up operation when a shutter release operation is started, and for starting a travel of a shutter front curtain, based on the time information calculated by said time information calculation means, at the time when the surface of the subject image imaged by the taking optical system coincides with the prospective image surface.

12. An automatic focusing apparatus comprising:

focus detection means for repeatedly calculating an amount of defocus corresponding to the difference between a surface of a subject image imaged by a taking optical system and a prospective image surface in a conjugate relationship with a film surface;

image surface speed calculation means for calculating speed at which the surface of the subject image imaged by the taking optical system moves with the movement of the subject on the basis of present and past amounts of defocus calculated by said focus detection means;

lens drive control means for driving and controlling the taking optical system on the basis of said amount of defocus calculated by said focus detection means and speed of the subject image surface calculated by said image surface speed calculation means, wherein the driving and the controlling of the taking optical system continue after start of a shutter release operation;

time information calculation means for calculating time information indicating the time when the surface of the subject image imaged by the taking optical system will coincide with the prospective image surface on the basis of said amount of defocus, the speed of said image surface and drive speed of the taking optical system driven and controlled by said lens drive control means; and shutter release control means for immediately selecting, based on the time information, whether or not a mirror-up operation will be started when a shutter release operation is started, and for starting a travel of a shutter front curtain, based on the time information, at the time when the surface of the subject image imaged by the taking optical system coincides with the prospective image surface.

* * * * *